United States Patent
Hasegawa et al.

(10) Patent No.: US 6,567,239 B1
(45) Date of Patent: May 20, 2003

(54) THIN FILM MAGNETIC HEAD INCLUDING A COIL INSULATING RESIN FILLER AND AN INSULATING METALLIC LAYER COVERING AT LEAST PARTLY THE INSULATING RESIN FILLER ON A DATUM PLANE

(75) Inventors: Minoru Hasegawa, Kawasaki (JP); Yoshinori Ohtsuka, Kawasaki (JP); Yuji Uehara, Kawasaki (JP); Takashi Sekikawa, Kawasaki (JP); Hiroshi Maeda, Kawasaki (JP); Masahiro Kakehi, Kawasaki (JP); Ikuya Tagawa, Kawasaki (JP); Tomoko Kutsuzawa, Kawasaki (JP); Syuji Nishida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 73 days.

(21) Appl. No.: 09/716,345

(22) Filed: Nov. 20, 2000

(30) Foreign Application Priority Data

Mar. 8, 2000 (JP) ........................................ 2000-063006

(51) Int. Cl.⁷ .............................................. G11B 5/147
(52) U.S. Cl. ...................................................... 360/126
(58) Field of Search .................................. 360/126, 317

(56) References Cited

U.S. PATENT DOCUMENTS 6,018,862 A * 2/2000 Stageberg .................... 360/126

FOREIGN PATENT DOCUMENTS

| JP | 11259812 | 9/1999 |
| JP | 11288503 | 10/1999 |
| JP | 11316906 | 11/1999 |

* cited by examiner

Primary Examiner—A. J. Heine
(74) Attorney, Agent, or Firm—Greer, Burns & Crain, Ltd.

(57) ABSTRACT

A liquid resist is introduced between adjacent conductive lines of a coil pattern girdling around a magnetic core piece. When the liquid resist is cured, an insulating resin filler can be fixed between the adjacent conductive lines of the coil pattern. An insulating metallic layer is formed to extend over the insulting resin filler and the conductive lines of the coil pattern. Thereafter, the insulating metallic layer is subjected to a flattening grinding treatment until at least a part of the conductive line is exposed at a flattened surface. Since the liquid of the resist, of a higher fluidity, penetrates in every hole and corner between the adjacent conductive lines, the gap defined between the adjacent conductive lines is fully filled with the insulating material. No voids remain in the gap. The conductive line of the coil can be reliably prevented from corrosion or oxidation. Moreover, a relatively brittle of fragile insulating resin filler is reliably prevented from being subjected to the flattening grinding treatment.

6 Claims, 10 Drawing Sheets

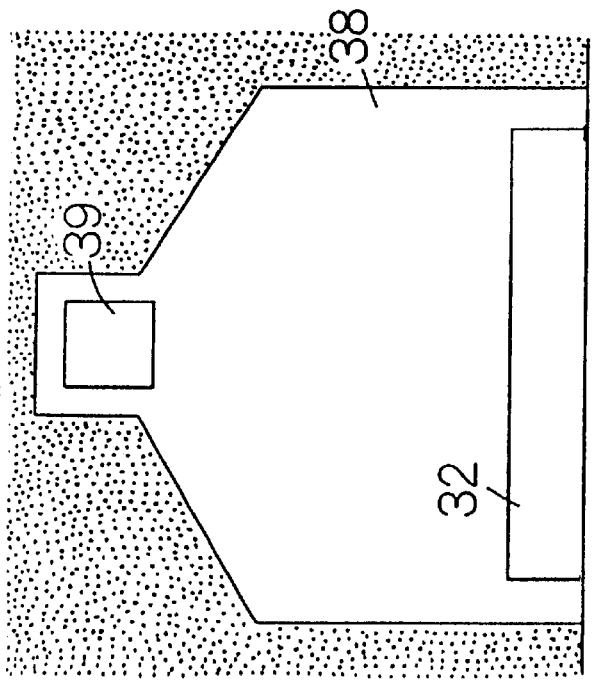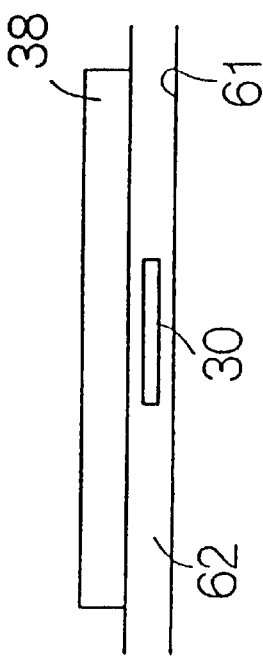
FIG. 7B  FIG. 7D
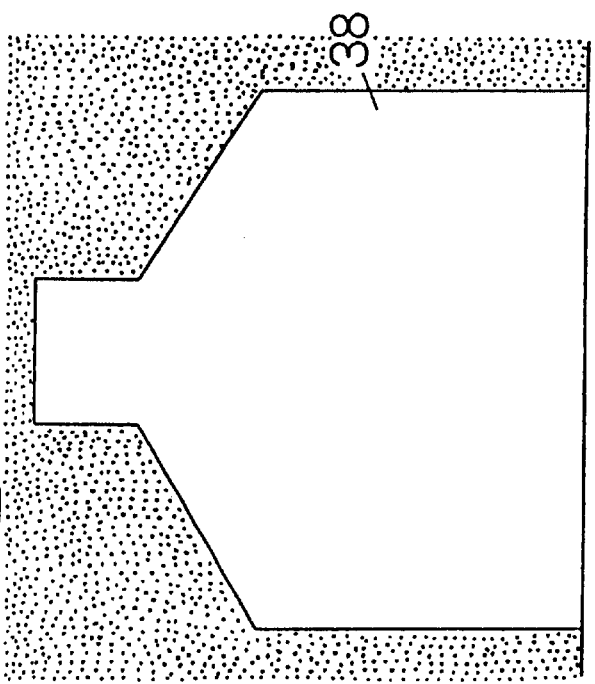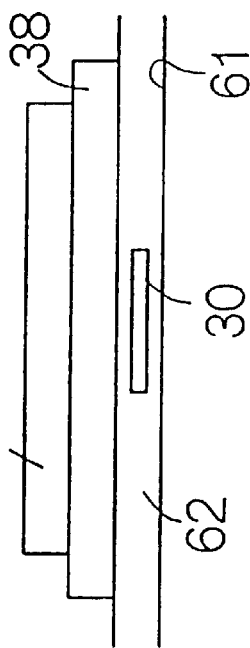
FIG. 7A  FIG. 7C

THIN FILM MAGNETIC HEAD INCLUDING A COIL INSULATING RESIN FILLER AND AN INSULATING METALLIC LAYER COVERING AT LEAST PARTLY THE INSULATING RESIN FILLER ON A DATUM PLANE

BACKGROUND OF THE INVENTION

1. Field of the Invention

The present invention relates to a method of making or producing a thin film magnetic head in general employed in a recording medium drive or storage device such as a magnetic disk drive and a magnetic tape drive, and in particular, to a method of producing a thin film magnetic head including a magnetic core piece and a coil girdling around the magnetic core piece.

2. Description of the Prior Art

A thin film magnetic head in general includes an insulating layer incorporating a thin film coil pattern. It is preferable that the insulating layer is flattened at the exposed surface thereof before another thin film coil pattern or an upper magnetic or pole layer is formed on the exposed surface of the insulating layer. The flat surface of the insulating layer is expected to realize establishment of another thin film coil pattern or the upper magnetic layer of a fine accurate pattern over the insulating layer. Such a fine accurate pattern contributes to reduction in the width of a recording track on a magnetic recording medium, for example.

In the case where the insulating layer is subjected to a flattening grinding treatment, the insulating layer is in general made of a metal oxide such as $Al_2O_3$. Sputtering or vacuum evaporation is employed to form a layer or lamination of such a metal oxide.

A still higher rate for writing binary magnetic data is expected in the technical field of magnetic disk drives. For example, a smaller coil having a reduced or narrower gap between the adjacent conductive lines is supposed to lead to accomplishment of the still higher rate for writing in the thin film magnetic head. If the gap between the adjacent conductive lines is reduced in this manner, it is impossible to employ a conventional method, such as sputtering and vacuum evaporation, for filling out the narrower gap between the adjacent conductive lines. Sputtering and vacuum evaporation cannot avoid generation of voids within the gap between the adjacent conductive lines. The remaining voids may induce corrosion or oxidation of the conductive lines, which may result in an increase in electric resistance of the conductive lines. An electric current of a higher voltage should be supplied to such a coil after corrosion or oxidation. The coil may also suffer from an accelerated generation of heat. These are not preferable.

SUMMARY OF THE INVENTION

It is accordingly an object of the present invention to provide a method of producing a thin film magnetic head which includes a coil embedded in an insulating layer without any voids between adjacent conductive lines of the coil, keeping the surface of the insulating layer flat.

According to the present invention, there is provided a method of producing a thin film magnetic head, comprising: forming a magnetic core piece; forming parallel conductive lines, girdling around the magnetic core piece on a datum plane, so as to establish a coil; applying a liquid of a resist between the adjacent conductive lines in the coil; curing the liquid of the resist so as to form an insulating resin filler between the adjacent conductive lines; covering the insulating resin filler and the conductive lines with an insulating metallic layer; and subjecting the insulating metallic layer to a flattening grinding treatment until at least a part of the conductive line is exposed at a flattened surface.

The method of producing is allowed to employ the liquid of the resist, of a higher fluidity, to form an insulating material between the adjacent conductive lines in the coil. The liquid of the resist penetrates in every hole and corner between the adjacent conductive lines, so that the gap defined between the adjacent conductive lines is fully filled with the insulating material. No voids remain in the gap. The conductive line of the coil can be reliably prevented from corrosion or oxidation. Any fluid or liquid, such as a liquid of a thermosetting resin or a light-reactive resin, can be employed as the liquid of the resist. The light-reactive resin may include a resin reactive to irradiation of the ultraviolet and the like.

Moreover, the flattening grinding treatment can be conducted after the insulating metallic layer is formed to extend over the insulating resin filler in the method of producing. A relatively brittle or fragile insulating resin filler is reliably prevented from being subjected to the flattening grinding treatment. To the contrary, if the insulating resin filler is subjected to the flattening grinding treatment, the surface of the insulating resin filler gets sandy under the excessive influence of an abrasive agent, so that a flat surface cannot be obtained. According to the method of the invention, it is possible to reliably establish a flat surface on the insulating metallic layer after the flattening grinding treatment. A fine patterning can be achieved to form an upper coil and/or an upper magnetic layer on the flattened surface. Such a fine patterning is expected to contribute to reduction in the gap between the adjacent conductive lines in the coil and/or improvement in the density of recording tracks on a recording medium. A metallic oxide compound may be employed to form the insulating metallic layer, for example.

The method of producing preferably further comprises: applying the liquid of the resist until the conductive lines are fully sunk in the liquid of the resist; half-curing the liquid of the resist; and thereafter subjecting the liquid of the resist to a reactive etching process until a groove is formed between the adjacent conductive lines. If the aforementioned insulating metallic layer is formed to fill out the groove, the conductive line of the coil can be exposed during the flattening grinding treatment while the insulating metallic layer still remains between the adjacent conductive lines. The insulating metallic layer is allowed to reliably keep covering over the insulating resin filler even when the conductive line fully exposes its top surface. The insulating resin filler is reliably prevented from exposure during the flattening grinding treatment. Generation of a sandy surface can be avoided on the insulating resin filler.

An abrasive slurry preferably contains a reactive agent capable of changing its color in response to contact with the conductive line in the flattening grinding treatment. In general, a wafer is urged against the surface of a rotating faceplate in the flattening grinding treatment. An abrasive slurry is introduced to extend over the surface of the faceplate. The abrasive slurry serves to grind or polish the surface of the wafer. In this case, if the abrasive slurry contains the reactive agent in the aforementioned manner, the reactive agent serves to indicate the completion of the flattening grinding treatment. Specifically, an operator can reliably notice the exposure of the conductive line in response to the change of color during the flattening grinding treatment. The operator is allowed to reliably stop grinding upon the exposure of the conductive line. The insulating metallic layer is reliably prevented from an excessive removal during the flattening grinding treatment. The insulating resin filler is accordingly prevented from exposure after the completion of the flattening grinding treatment.

It should be noted that the insulating layer such as the insulating resin filler and the insulating metallic layer may be formed not only within the gap defined between the adjacent conductive lines of the coil in the aforementioned manner but also within the gap defined between a tip pole piece located outside the coil and the outer periphery of the coil as well as within the gap defined between the inner outline of the coil and the magnetic core piece.

The above-described method may contributed to production of a thin film magnetic head comprising: a magnetic core piece; a coil including parallel conductive lines girdling around the magnetic core piece over a predetermined datum plane; an insulating resin filler filled between the adjacent conductive lines; and an insulating metallic layer covering at least partly the insulating resin filler on the datum plane, said insulating metallic layer designed to define a flat top surface. Otherwise, a thin film magnetic head may comprise: a tip pole piece exposed at a medium-opposed surface; a coil girdling around over a predetermined datum plane and opposing its outer periphery to the tip pole piece; an insulating resin filler filled between the tip pole piece and the coil; and an insulating metallic layer covering at least partly the insulating resin filler on the datum plane, said insulating metallic layer designed to define a flat top surface. Furthermore, a thin film magnetic head may comprise: a magnetic core piece; a coil girdling around the magnetic piece over a predetermined datum plane; an insulating resin filler filled between the magnetic core piece and an inner outline of the coil; and an insulating metallic layer covering at least partly the insulating resin filler on the datum plane, said insulating metallic layer designed to define a flat top surface.

BRIEF DESCRIPTION OF THE DRAWINGS

The above and other objects, features and advantages of the present invention will become apparent from the following description of the preferred embodiments in conjunction with the accompanying drawings, wherein:

FIGS. 7A, 7B, 7C and 7D are front and plan views schematically illustrating a method of producing a thin film magnetic head;

DESCRIPTION OF THE PREFERRED EMBODIMENTS

Figure 1:
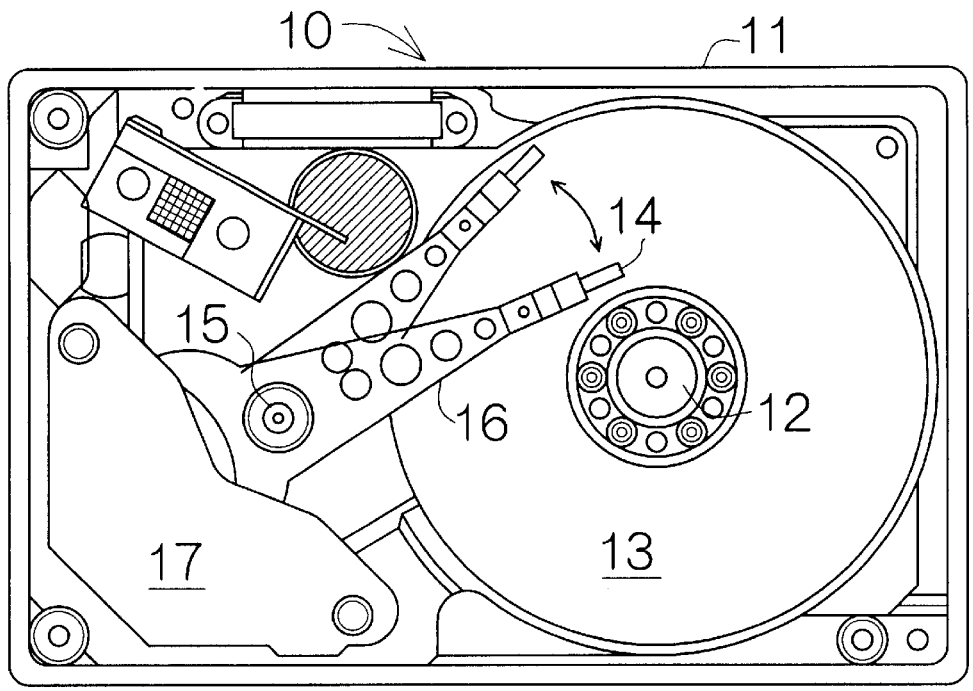
FIG. 1 is plan view schematically illustrating the structure of a hard disk drive (HDD)

FIG. 1 schematically illustrates a hard disk drive (HDD) 10 as an example of a recording medium drive or storage device. The HDD 10 includes a box-shaped enclosure 11 defining an inner space in the form of a flat rectangular parallelepiped, for example. The enclosure 11 is designed to incorporate one or more magnetic disks 13 as a recording medium mounted on a spindle motor 12, and a flying head slider or sliders 14 opposed to the corresponding surfaces of the magnetic disks 13. The spindle motor 12 induces the rotation of the magnetic disks 13 around its rotational axis.

The flying head slider 14 is fixed to the tip or leading end of a carriage arm 16 which is capable of swinging around a support axis 15. When information data is readout of or written into the magnetic disk 13, an electromagnetic actuator 17 serves to drive the carriage arm 16 for swinging movement, so that the flying head slider 14 is allowed to move across the surface of the magnetic disk 13 in its radial direction. Such a radial movement can be utilized to position the flying head slider 14 right above a target recording track on the magnetic disk 13. A cover, not shown, is coupled to the opening of the enclosure 11 so as to air-tightly seal the inner space within the enclosure 11.

Figure 2:
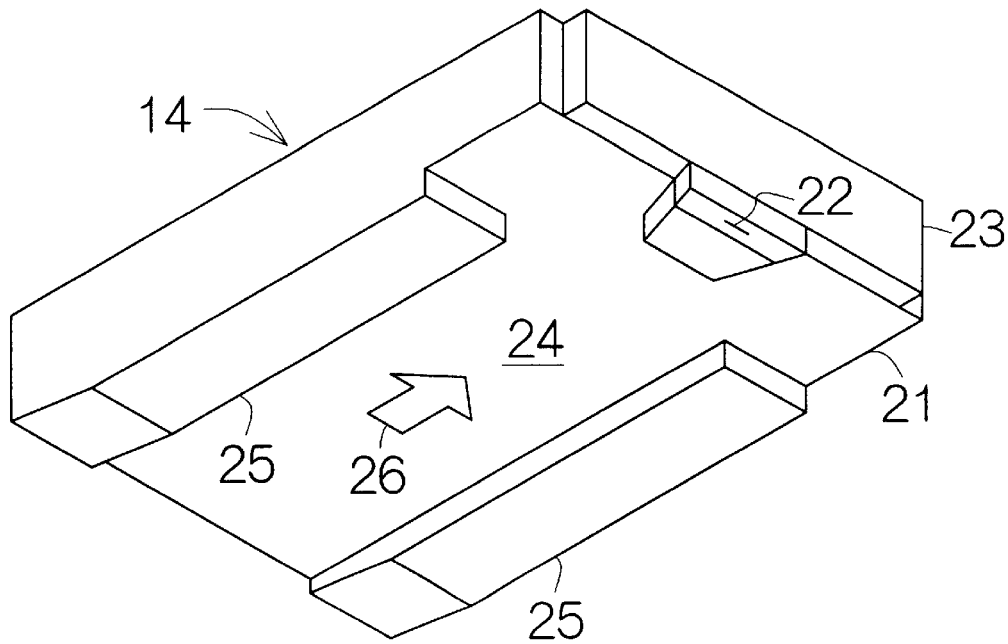
FIG. 2 is an enlarged perspective view of an example of a flying head slider.

FIG. 2 illustrates an example of the flying head slider 14. The flying head slider 14 of this type includes a slider body 21 made of $Al_2O_3$—TiC, and a head containing layer 23 coupled to the trailing or downstream end of the slider body 21. The head containing layer 23 may be made of $Al_2O_3$. A read/write head 22 is embedded in the head containing layer 23. A medium-opposed surface or bottom surface 24 is defined over the slider body 21 and the head containing layer 23 so as to face the surface of the magnetic disk 13 at a distance. A pair of rails 25 are formed to extend over the bottom surface 24. The individual rail 25 is designed to define an air bearing surface (ABS) at its lowest surface. The flying head slider 14 is forced to fly above the surface of the rotating magnetic disk 13 by receiving an airflow 26 at the bottom surface 24, in particular, at the ABS.

Figure 3:
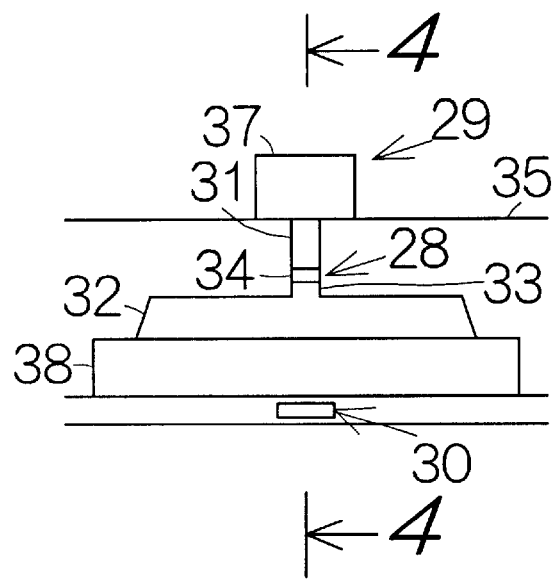
FIG. 3 is an enlarged partial plan view schematically illustrating the structure of a read/write head.

FIG. 3 illustrates an enlarged view of the bottom surface 24. As shown in FIG. 3, the read/write head 22 includes a thin film magnetic head element 29 and a magnetoresistive (MR) element 30. The thin film magnetic head element 29 is designed to exert a magnetic field toward the magnetic disk 13 by utilizing a read gap 28 exposed at the bottom surface 24. The MR element 30 is designed to detect the direction of magnetization at the surface of the magnetic disk 13 by utilizing a well-known magnetoresistive (MR) effect. The MR element 30 may include a giant magnetoresistive (GMR) element, a tunnel-junction magnetoresistive (TMR) element, and the like.

The read gap 28 can be defined between a pair of magnetic pole pieces, namely, upper and lower tip or front pole pieces 31, 32, exposed at the bottom surface 24. A tiny or narrower protrusion 33 is formed on the lower tip pole piece 32 so as to face the narrower upper tip pole piece 31 at a distance. A non-magnetic layer, namely, a gap layer 34 is interposed between the tiny protrusion 33 and the upper tip pole piece 31. The gap layer 34 serves to achieve leakage of a magnetic flux, passing through the upper tip pole piece 31 and the tiny protrusion 33, out of the bottom surface 24. The leaked magnetic flux forms a magnetic field for recordation. The gap layer 34 and the upper and lower tip pole pieces 31, 32 are all embedded in an insulating layer 35.

Figure 4:
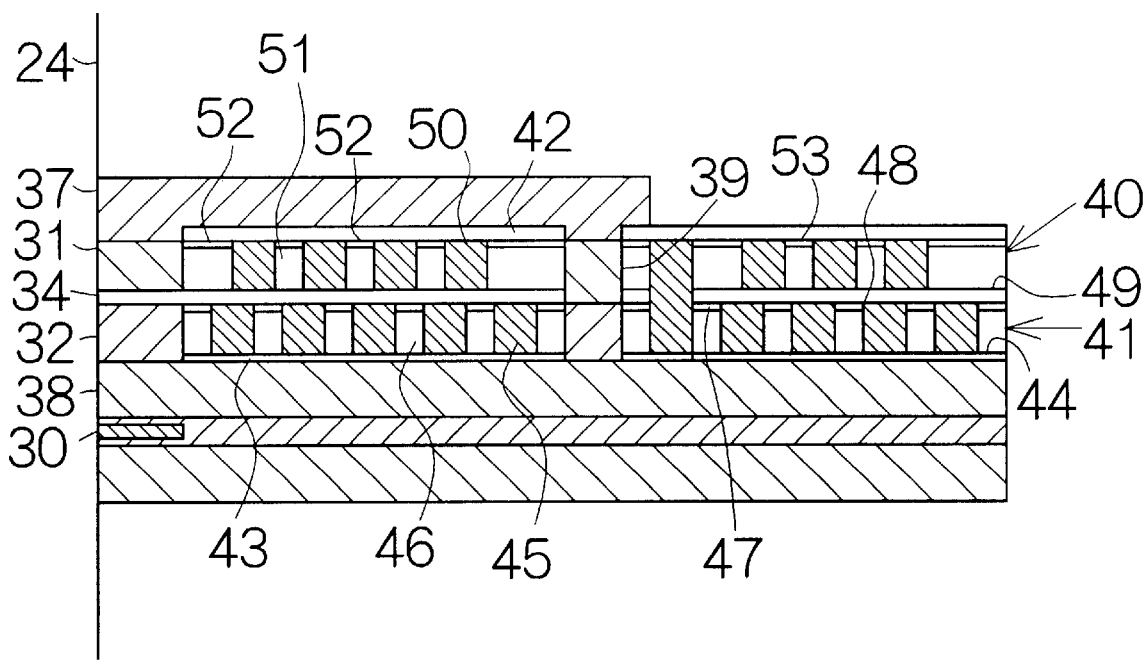
FIG. 4 is a sectional view taken along the line 4—4 in FIG. 3.

Referring also to FIG. 4, the upper and lower tip pole pieces 31, 32 are interposed between an upper and a lower magnetic layer 37, 38. The upper magnetic layer 37 is designed to extend rearward from the tip or front end exposed at the bottom surface 24. The lower magnetic layer 38 is likewise designed to extend rearward from the tip or front end exposed at the bottom surface 24. A magnetic piece or a so-called back gap 39 is disposed between the upper and lower magnetic layers 37, 38 at a rear position spaced from the upper and lower tip pole pieces 31, 32. The back gap 39 penetrates through the gap layer 34 so as to magnetically connect the upper and lower magnetic layers 37, 38 to each other. The tip or front end of the upper magnetic layer 37 is received on the upper tip pole piece 31. Likewise, the tip or front end of the lower magnetic layer 38 is connected to the lower tip pole piece 32.

Upper and lower inductive layers 40, 41 are disposed between the upper and lower magnetic layers 37, 38. The gap layer 34 serves as a partition between the upper and lower inductive layers 40, 41. An insulating layer 42 of a constant thickness is formed to extend between the upper inductive layer 40 and the upper magnetic layer 37. Likewise, an insulating layer 43 of a constant thickness is formed to extend between the lower inductive layer 41 and the lower magnetic layer 38. Specifically, the insulating layer 43, the lower inductive layer 41, the gap layer 34, the upper inductive layer 40, the insulating layer 42 and the upper magnetic layer 37 are superposed in this sequence on the surface of the lower magnetic layer 38.

Figure 5:
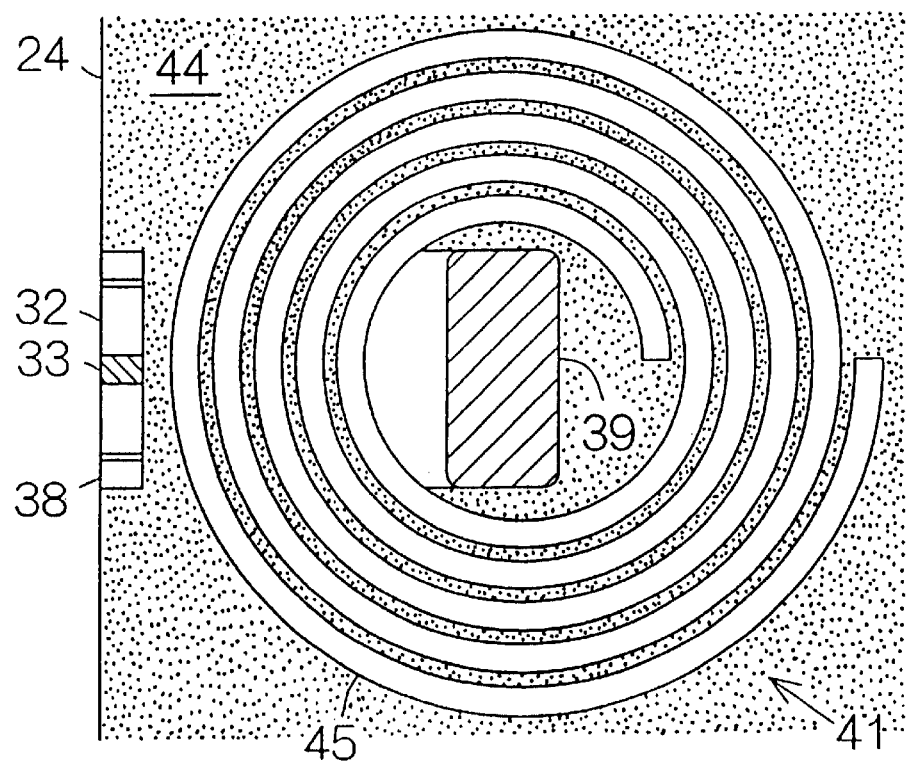
FIG. 5 is a plan view schematically illustrating the structure of a lower inductive layer.

Referring also to FIG. 5, the lower inductive layer 41 includes a thin film coil pattern 45 extending over a datum plane 44 defined by the surface of the insulating layer 43. The coil pattern 45 is designed to girdle around the back gap 39. Specifically, a swirly thin conductive line is defined to extend outwardly from a position nearest to the back gap 39 in the coil pattern 45. As is apparent from FIG. 4, the gap between the adjacent conductive lines is filled out with an insulating resin filler 46 in the coil pattern 45. Likewise, the insulating resin filler 46 is designed to fill up a gap defined between the lower tip pole piece 32 and the outer periphery of the coil pattern 45 as well as a gap defined between the inner outline of the coil pattern 45 and the back gap 39. An insulating metallic layer, namely, a metallic oxide layer 47 is superposed over the insulating resin filler 46. The metallic oxide layer 47 is designed to cover over the insulating resin filler 46 on the datum plane 44. The conductive line of the coil pattern 45 is exposed at a first flat surface 48 at its upper surface. The metallic oxide layer 47 is also exposed at the first flat surface 48 at its upper surface.

Figure 6:
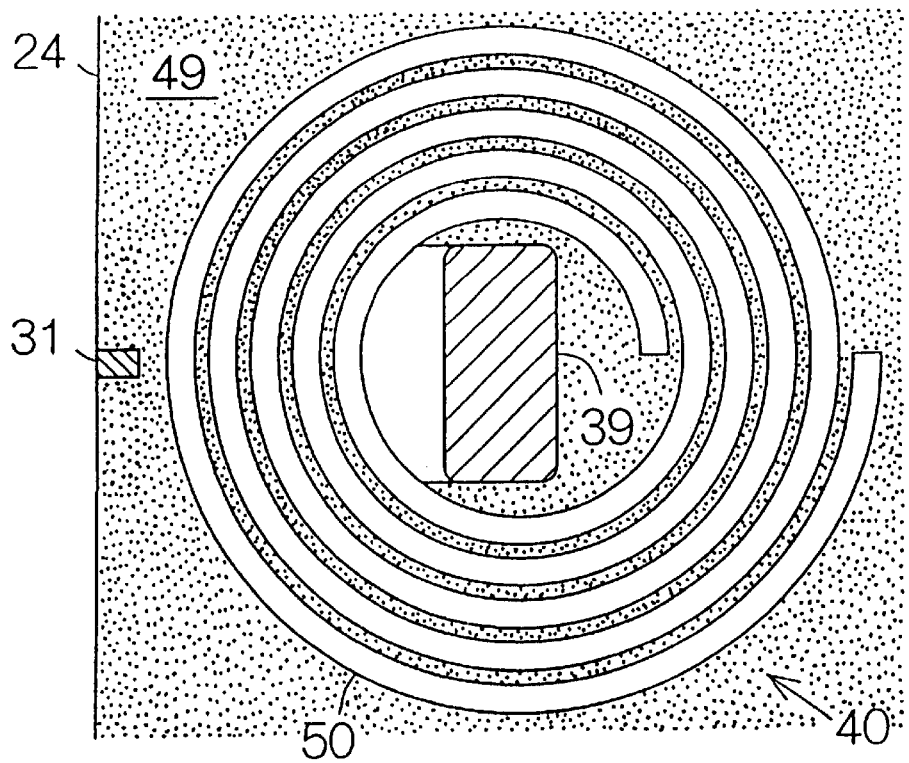
FIG. 6 is a plan view schematically illustrating the structure of an upper inductive layer.

As shown in FIGS. 4 and 6, the upper inductive layer 40 includes a thin film coil pattern 50 extending over a datum plane 49 defined by the surface of the gap layer 34. The coil pattern 50 is designed to girdle around the back gap 39. Specifically, a swirly thin conductive line is defined to extend outwardly from a position nearest to the back gap 39 in the coil pattern 50 in the same manner as the aforementioned coil pattern 45. As is apparent from FIG. 4, the gap between the adjacent conductive lines is filled out with an insulating resin filler 51 in the coil pattern 50. Likewise, the insulating resin filler 51 is designed to fill up a gap defined between the upper tip pole piece 31 and the outer periphery of the coil pattern 50 as well as a gap defined between the inner outline of the coil pattern 50 and the back gap 39. An insulating metallic layer, namely, a metallic oxide layer 52 is superposed over the insulating resin filler 51. The metallic oxide layer 52 is designed to cover over the insulating resin filler 51 on the datum plane 49. The conductive line of the coil pattern 50 is exposed at a second flat surface 53 at its upper surface. The metallic oxide layer 52 is also exposed at the second flat surface 53 at its upper surface.

When an electric current is supplied to the coil patterns 45, 50 in the aforementioned thin film magnetic head element 29, a magnetic field or flux is generated in the respective coil patterns 45, 50. The magnetic flux is allowed to circulate along a magnetic core comprising the back gap 39, the upper magnetic layer 37, the upper and lower tip pole pieces 31, 32, and the lower magnetic layer 38. The circulation of the magnetic flux serves to generate the aforementioned magnetic field for recordation.

Next, a brief description will be made on a method of producing the thin film magnetic head element 29. The MR element 30 is first formed in a conventional manner on the surface of a wafer comprising an $Al_2O_3$—TiC substrate and an $Al_2O_3$ lamination covering over the $Al_2O_3$—TiC substrate. As shown in FIGS. 7A and 7B, the MR element 30 may be embedded in an $Al_2O_3$ layer 62 on the surface of a shield layer 61 made of FeN or NiFe, for example. The lower magnetic layer 38 is formed to extend over the surface of the $Al_2O_3$ layer 62. The lower magnetic layer 38 may be made of NiFe, for example. The lower magnetic layer 38 is expected to function as a shield layer covering over the MR element 30 on the shield layer 61.

Subsequently, the lower tip pole piece 32 and a lower half of the back gap 39 are formed on the surface of the lower magnetic layer 38, as shown in FIGS. 7C and 7D. Electroplating may be employed to form the lower tip pole piece 32 and the lower half of the back gap 39, for example. As conventionally known, a photoresist can be employed to pattern the contour of the lower tip pole piece 32 and the back gap 39, for example.

Figure 8A:
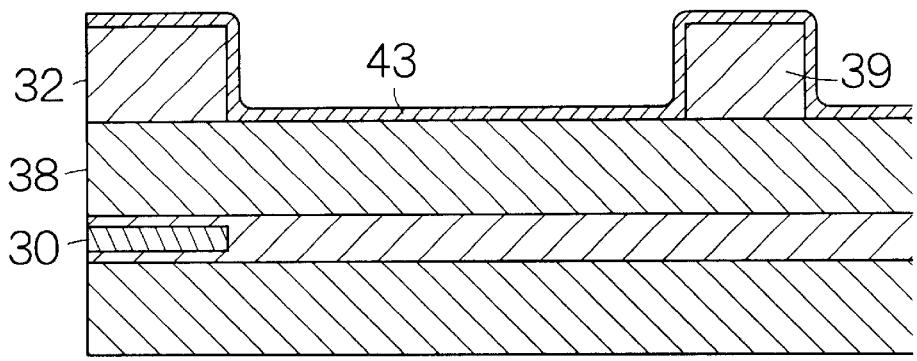
FIGS. 8A–8C are enlarged sectional views illustrating the process of forming the lower inductive layer.

Thereafter, the insulating layer 43 is formed on the surface of the lower magnetic layer 38, as shown in FIG. 8A. The insulating layer 43 may be made of $Al_2O_3$ or $SiO_2$, for example. Sputtering or vacuum evaporation may be employed to form the insulating layer 43. An insulating layer or material continuous to the insulating layer 43 serves to cover over the lower tip pole piece 32 and the lower half of the back gap 39.

Figure 8B:
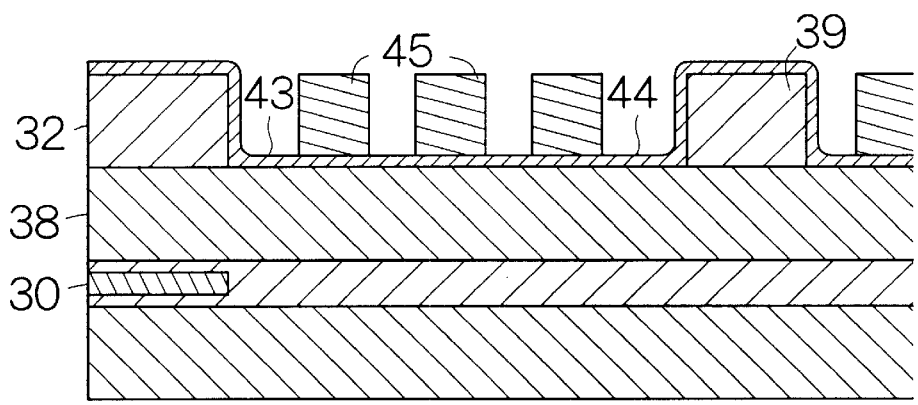

The lower inductive layer 41 is then formed on the surface of the insulating layer 43. In this case, the swirly conductive line of the coil pattern 45 is first formed on the datum plane 44 defined by the surface of the insulating layer 43 so as to girdling around the lower half of the back gap 39, as shown in FIG. 8B. Sputtering or electroplating may be employed to form the coil pattern 45 in a conventional manner, for example. A photoresist can be employed to pattern the contour of the swirly conductive line in the coil pattern 45.

Figure 8C:
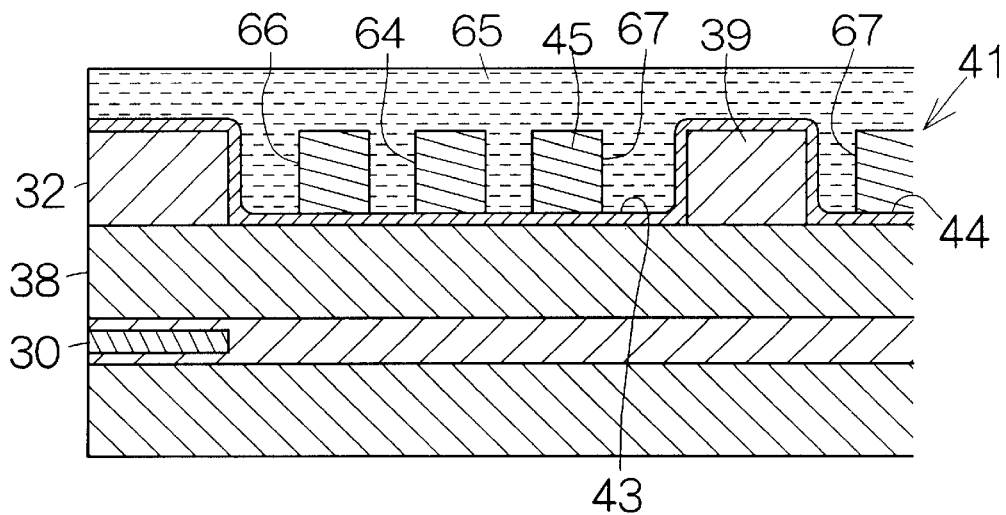

A liquid resist material 65 is then supplied into a gap 64 defined between the adjacent conductive lines of the coil pattern 45, as shown in FIG. 8C. The liquid resist material 65 is designed to completely cover over the lower tip pole piece 32, the conductive line of the coil pattern 45 and the lower half of the back gap 39. The liquid resist material 65 is allowed to penetrate into a gap 66 defined between the lower tip pole piece 32 and the outer periphery of the coil pattern 45 as well as a gap 67 defined between the inner outline of the coil pattern 45 and the lower half of the back gap 39. Any bubbles should completely be eliminated out of the gap 64 between the adjacent conductive lines of the coil pattern 45, the gap 66 between the lower tip pole piece 32 and the coil pattern 45 and the gap 67 between the coil pattern 45 and the back gap 39. Thereafter, the liquid resist material 65 is subjected to a soft baking treatment such as an irradiation of the ultraviolet. The liquid resist material 65 is half-cured. The liquid resist material 65 is shaped into a predetermined pattern during the soft baking treatment. Masking may be employed to block the irradiation of the ultraviolet so as to shape the liquid resist material 65.

Figure 9A:
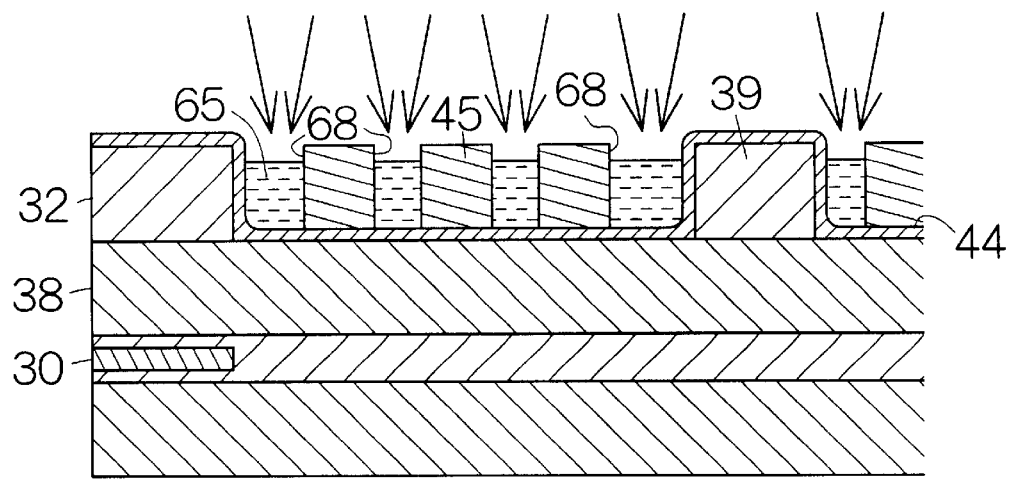
FIGS. 9A–9C are enlarged sectional views illustrating the process of forming the lower inductive layer.

As shown in FIG. 9A, the half-cured resist material 65 is then subjected to a reactive etching process. The reactive etching process may be represented by a plasma etching process employing an oxygen gas, a CFC gas, a mixture of these gases, selectively reactive to the resist material 65, for example. The reactive etching process serves to remove the half-cured resist material 65 only. The reactive etching process results in exposure of the conductive line of the coil pattern 45 at the surface of the half-cured resist material 65. Simultaneously, the insulating layer 43 is exposed at the surface of the lower tip pole piece 32 and the lower half of the back gap 39. As is apparent from FIG. 9A, the uppermost level of the resist material 65 is set below the upper surfaces of the conductive line of the coil pattern 45, the lower tip pole piece 32 and the lower half of the back gap 39. In other words, the height or thickness of the resist material 65, measured from the datum plane 44 defined by surface of the insulating layer 43, is set smaller than that of the conductive line of the coil pattern 45, the lower tip pole piece 32 and the lower half of the back gap 39. Accordingly, a groove 68 can be defined at the gap 64 between the adjacent conductive lines of the coil pattern 45, the gap 66 between the lower tip pole piece 32 and the outer periphery of the coil pattern 45, and the gap 67 between the inner outline of the coil pattern 45 and the lower half of the back gap 39. Thereafter, the half-cured resist material 65 is subjected to a hard baking treatment such as a heat treatment and/or an irradiation of the ultraviolet. The resist material 65 is completely cured or hardened. In this manner, the insulating resin filler 46 can be formed based on the liquid resist material 65.

Figure 9B:
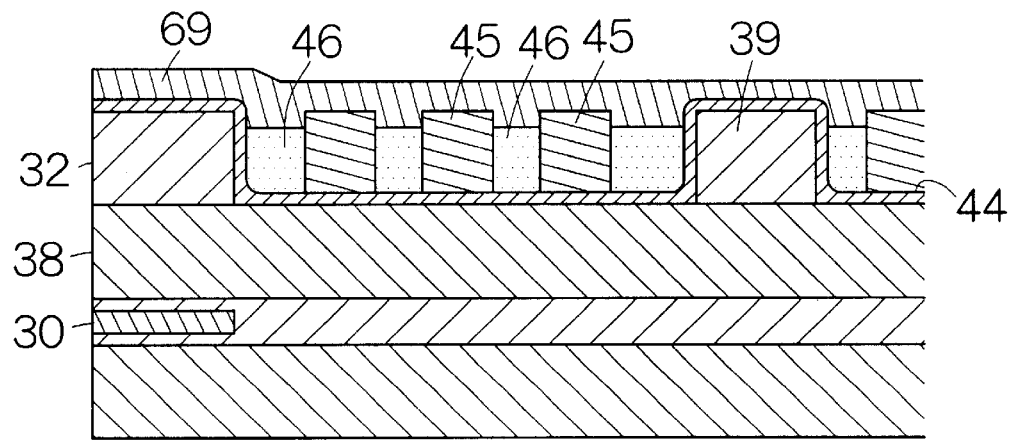
Figure 9C:
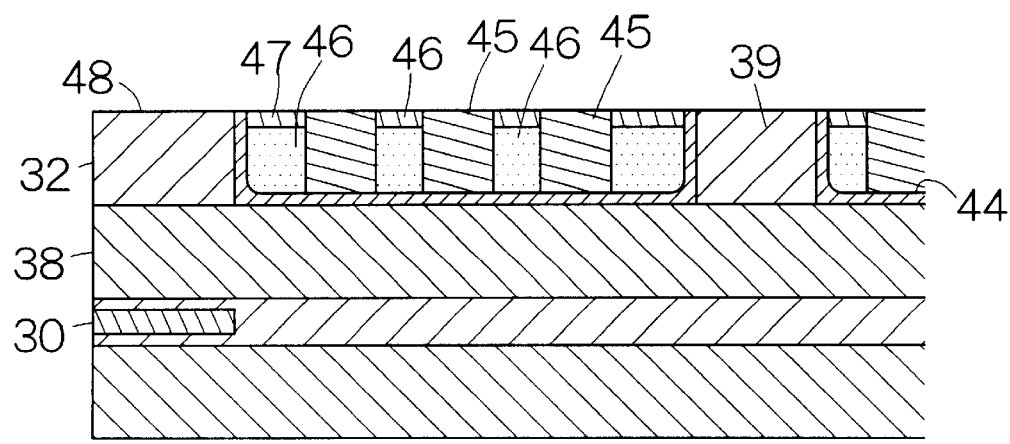

As shown in FIG. 9B, an insulating layer 69 of a metallic oxide compound such as $Al_2O_3$ is then formed on the surfaces of the insulating resin filler 46, the conductive line of the coil pattern 45, the lower tip pole piece 32 and the lower half of the back gap 39. Sputtering or vacuume vaporation maybe employed to form the insulating layer 69. Thereafter, the formed insulating layer 69 is subjected to a flattening grinding treatment, as shown in FIG. 9C. The insulating layer 69 is gradually removed from its surface during the flattening grinding treatment. This flattening grinding treatment is continued until the surfaces of the conductive line of the coil pattern 45, the lower tip pole piece 32 and the lower half of the back gap 39 are exposed again. In this manner, the conductive line of the coil pattern 45, the lower tip pole piece 32 and the lower half of the back gap 39 are forced to expose their surfaces at the finished first flat surface 48 at breaks of the insulating layer 69, namely, the metallic oxide layer 47, after the flattening grinding treatment.

Figure 10A:
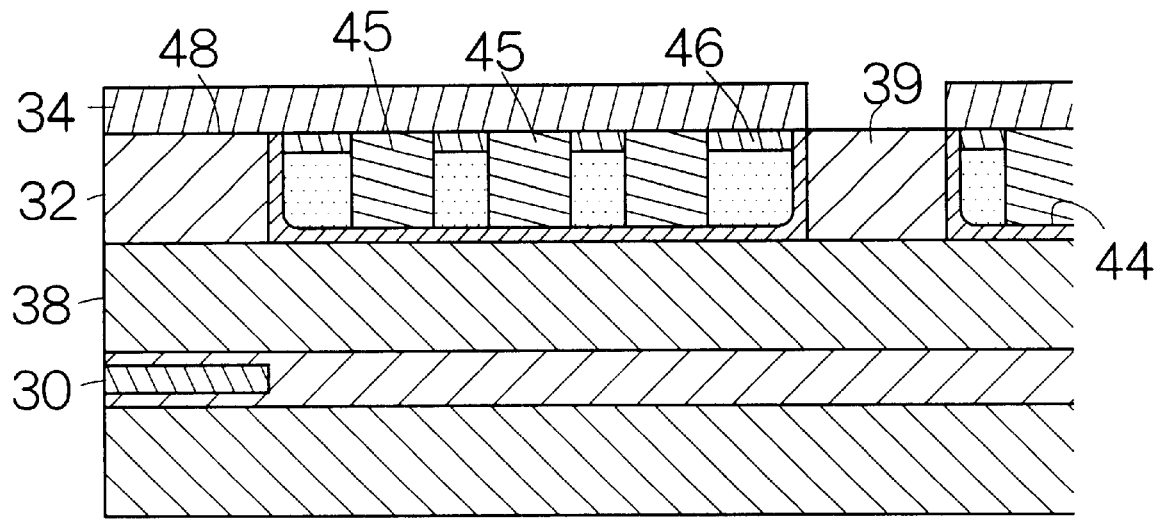
FIGS. 10A and 10B are enlarged sectional views illustrating the process of forming a gap layer and an upper tip pole piece on a first flattened surface.
Figure 10B:
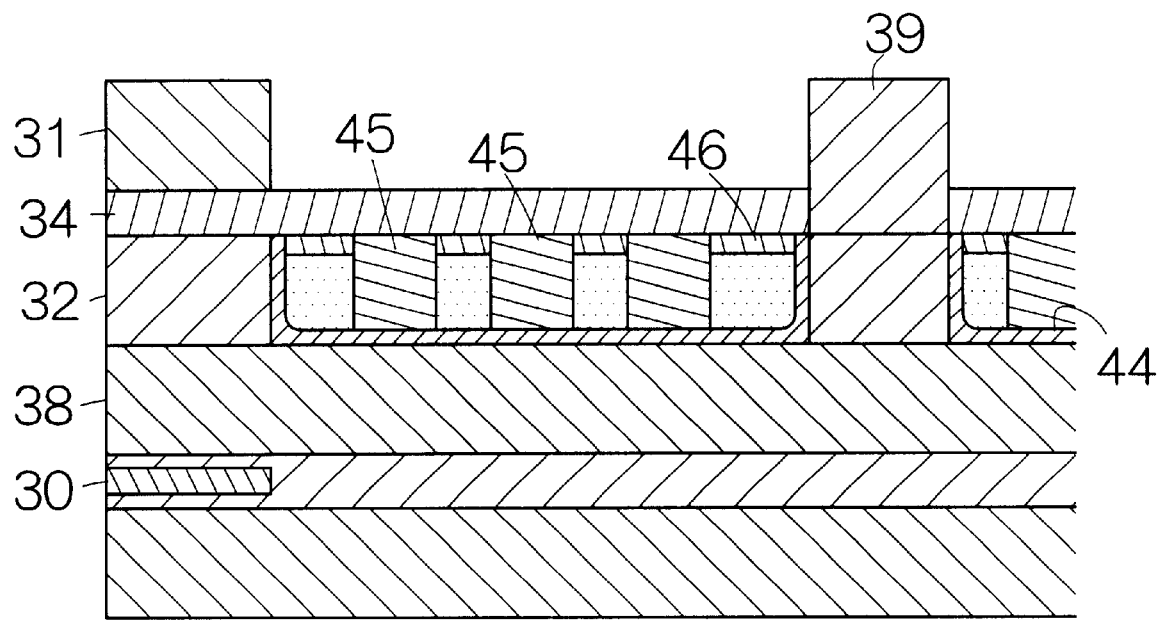

The gap layer 34 of a constant thickness is formed to extend over the finished first flat surface 48, as shown in FIG. 10A. The gap layer 34 is designed to cover over not only the lower tip pole piece 32 but also the conductive line of the coil pattern 45. The upper tip pole piece 34 is thereafter formed on the surface of the gap layer 34, as shown in FIG. 10B. Simultaneously, an upper half of the back gap 39 is superposed on the existing lower half of the back gap 39. Electroplating may be employed to form the upper tip pole piece 31 and the upper half of the back gap 39, for example. A photoresist may be utilized to pattern the contours of the upper tip pole piece 31 and the upper half of the back gap 39 in a conventional manner.

Figure 11:
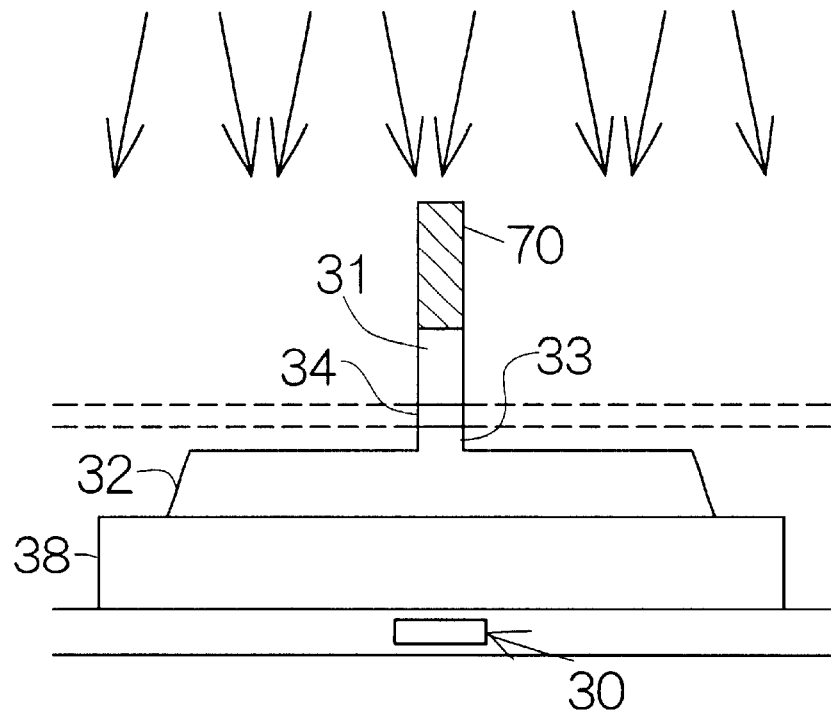
FIG. 11 is an enlarged front view illustrating the process of forming the upper tip pole piece.

When the upper tip pole piece 31 is utilized as a mask in an ion milling process, for example, the gap layer 34 can be shaped to have a contour identical to that of the upper tip pole piece 31, as shown in FIG. 11. Likewise, the tiny protrusion 33 can be shaped out of the lower tip pole piece 32 so as to have a contour identical to that of the upper tip pole piece 31. A resist film 70 may be applied to the top surface of the upper tip pole piece 31, as is apparent from FIG. 11, for example.

The upper inductive layer 40 is then formed to extend over the surface of the gap layer 34. The aforementioned method, utilized to form the lower inductive layer 41, can also be applied to form the upper inductive layer 40. Accordingly, the insulating resin filler 51 and the metallic oxide layer 52 are sequentially formed or layered within the gap defined between the adjacent conductive lines of the coil pattern 50, the gap defined between the upper tip pole piece 31 and the outer periphery of the coil pattern 50 as well as the gap defined between the inner outline of the coil pattern 50 and the upper half of the back gap 39, as is apparent from FIG. 4, for example. Moreover, as a result of the flattening grinding treatment in the aforementioned manner, the conductive line of the coil pattern 50, the upper tip pole piece 31 and the upper half of the back gap 39 are allowed to expose their surfaces at the finished second flat surface 53 at breaks of the metallic oxide layer 52.

Figure 12:
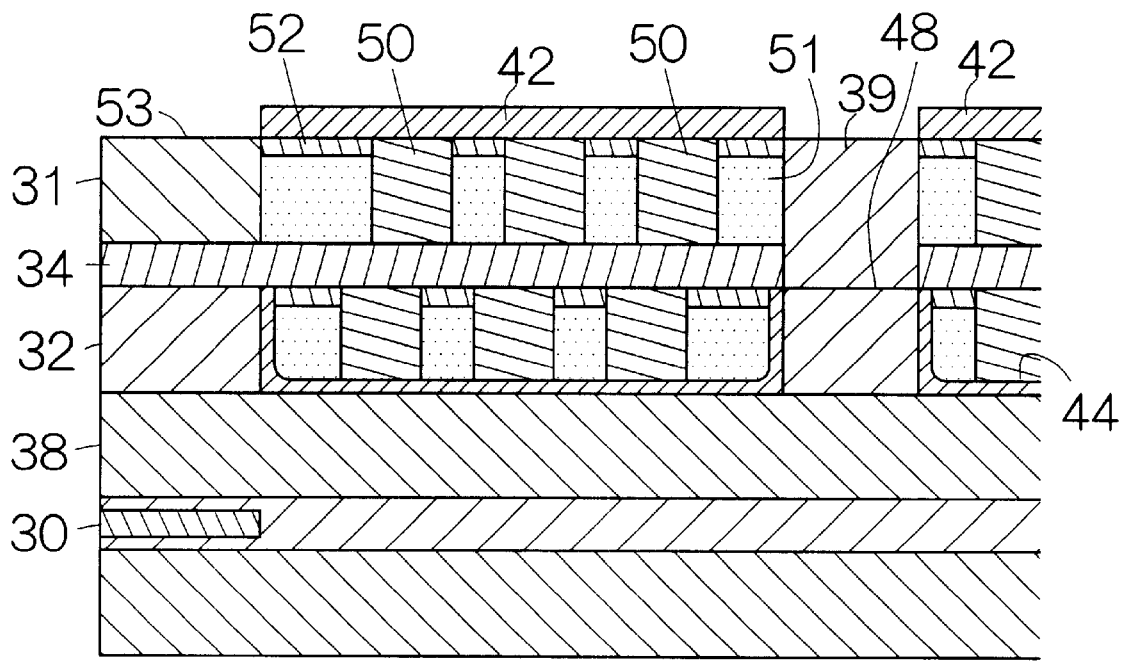
FIG. 12 is an enlarged sectional view illustrating the process of forming an insulating layer on a second flattened surface.

As shown in FIG. 12, the insulating layer 42 of a constant thickness is then formed on the finished second flat surface 53. The insulating layer 42 is designed to cover over the conductive line of the coil pattern 50. Thereafter, the upper magnetic layer 37 is formed to extend over the surface of the insulating layer 42. The tip or front end of the upper magnetic layer 37 is allowed to contact the upper tip pole piece 31. Simultaneously, the rear end of the upper magnetic layer 37 contacts the upper half of the back gap 39. For example, electroplating may be employed to form the upper magnetic layer 37 in this manner. A photoresist may be employed to pattern the contour of the upper magnetic layer 37 in a conventional manner.

In the above-described method, the upper inductive layer 40 and the upper magnetic layer 37 can be formed on the first and second flat surfaces 48, 53, respectively. A fine patterning can be achieved to form the upper inductive layer 40 and the upper magnetic layer 37 at a higher accuracy. Such a fine patterning greatly contributes to reduction in the gap between the adjacent conductive lines in the coil pattern 50 as well as improvement in the density of recording tracks on the magnetic disk 13.

In addition, in the above-described method, the liquid resist material 65 of a higher fluidity is employed to form the insulating layer in the gap between the adjacent conductive lines of the respective coil patterns 45, 50, the gap between the upper and lower tip pole pieces 31, 32 and the outer periphery of the respective coil patterns 45, 50, and the gap between the inner outlines of the respective coil patterns 45, 50 and the back gap 39. The liquid resist material 65 is allowed to penetrate into the corners in the respective gaps. Accordingly, the gaps are completely filled with the insulating layer. No voids remain in the gaps. The conductive line in the coil patterns 45, 50 can reliably be prevented from corrosion or oxidation which may result from the remaining voids in the gaps. If sputtering or vacuum evaporation of a metallic oxide compound is employed in place of supply of the liquid resist material 65 so as to form the insulating layer, fine particles of the metallic oxide compound tends to cumulate at the entrance or opening of the gap, so that the metallic oxide compound cannot reach the bottom or corners of the gap.

Furthermore, in the above-described method, the flattening grinding treatment is conducted after the metallic oxide layer is formed to extend over the insulating resist material in the gap between the gap between the adjacent conductive lines of the respective coil patterns 45, 50, the gap between the upper and lower tip pole pieces 31, 32 and the outer periphery of the respective coil patterns 45, 50, and the gap between the inner outlines of the respective coil patterns 45, 50 and the back gap 39. Accordingly, the relatively brittle or fragile insulating resin filler is prevented from being subjected to the flattening grinding treatment. To the contrary, if the insulating resin filler is subjected to a flattening grinding treatment, the surface of the insulating resin filler gets sandy under the influence of an abrasive agent. It is not possible to establish the first and second flat surfaces 48, 53.

In the aforementioned flattening grinding treatment, the surface of the wafer is urged against the surface of a rotating faceplate, as conventionally known. An abrasive slurry extending over the surface of the faceplate serves to grind or polish the surface of the wafer. In general, fine particles of the abrasive agent are contained and spattered in the abrasive slurry.

In this case, a reactive agent may be mixed in the abrasive slurry. Such a reactive agent preferably has the property capable of changing its color in response to contact with ions contained in the conductive lines of the aforementioned coil patterns 45, 50, the upper and lower tip pole pieces 31, 32 and the back gap 39. The reactive agent serves to indicate the completion of the flattening grinding treatment. Specifically, an operator can reliably stop grinding upon exposure of the coil patterns 45, 50, the upper and lower tip pole pieces 31, 32 and the back gap 39 at the first and second flat surfaces 48, 53, respectively. The metallic oxide layers 47, 52 are reliably prevented from an excessive removal during the flattening grinding treatment.

Figure 13:
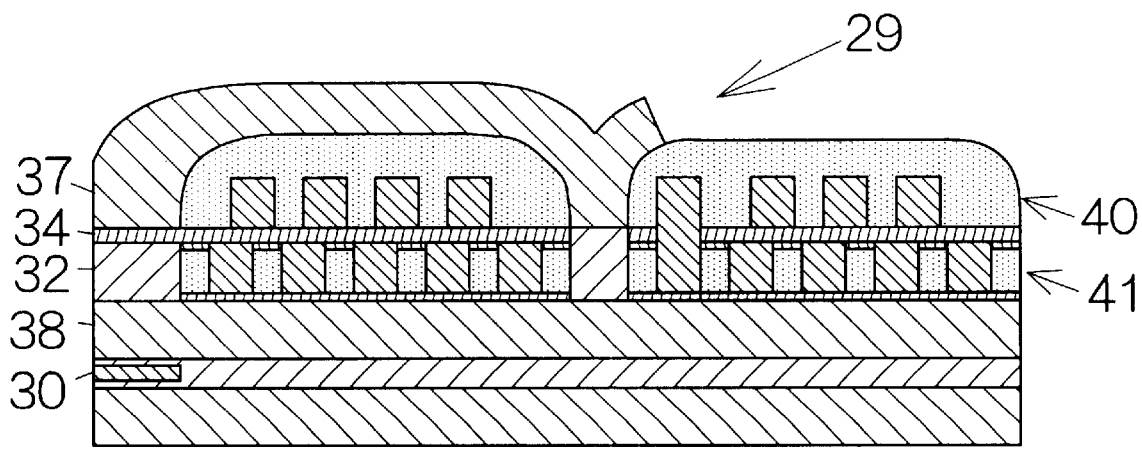
FIG. 13 is a sectional view, corresponding to FIG. 5, schematically illustrating the structure of a thin film magnetic head element according to another embodiment of the present invention.
Figure 14:
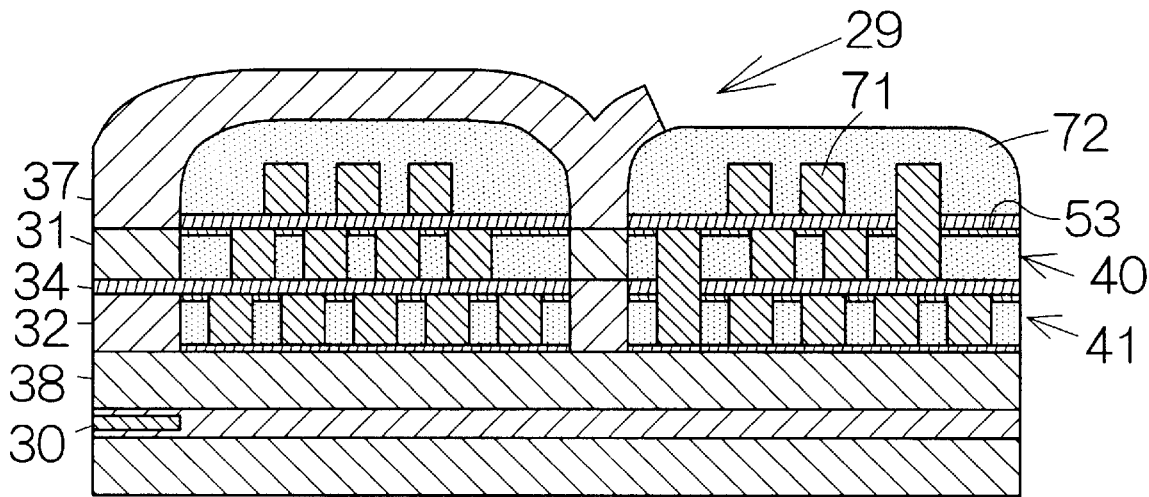
FIG. 14 is a sectional view, corresponding to FIG. 5, schematically illustrating the structure of a thin film magnetic head element according to a further embodiment of the present invention.
Figure 15:
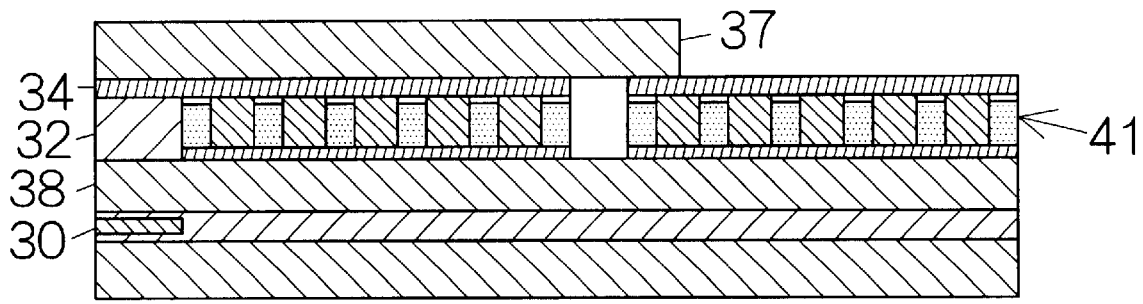
FIG. 15 is a sectional view, corresponding to FIG. 5, schematically illustrating the structure of a thin film magnetic head element according to a still further embodiment of the present invention.
Figure 16:
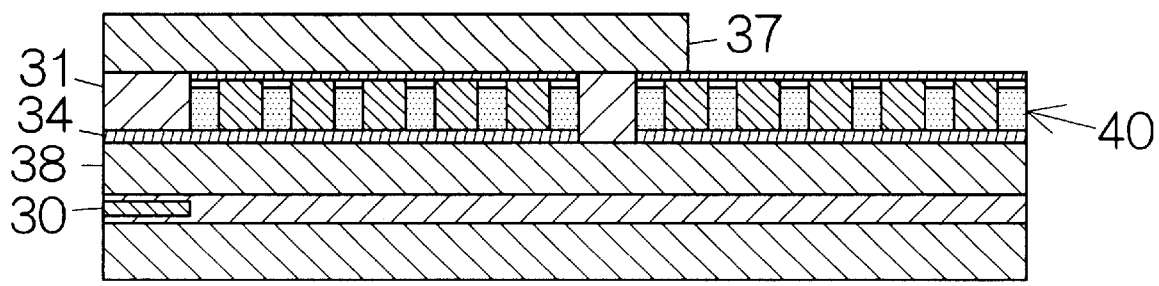
FIG. 16 is a sectional view, corresponding to FIG. 5, schematically illustrating the structure of a thin film magnetic head element according to a still further embodiment of the present invention.

For example, the aforementioned second flat surface 53 need not be formed in the thin film magnetic head element 29, as shown in FIG. 13. On the other hand, another coil pattern 71 and insulating layer 72 may be formed on the second flat surface 53, as shown in FIG. 14. Otherwise, the upper magnetic layer 37 may be formed directly on the gap layer 34 without interposal of the upper inductive layer 40 in the thin film magnetic head element 29, as shown in FIG. 15. Furthermore, the upper inductive layer 40 may be formed on the gap layer 34 without interposal of the lower inductive layer 41, as shown in FIG. 16. In any event, a flat surface can be defined on the respective inductive layers 40, 41 in the aforementioned manner.

It should be noted that the thin film magnetic head element 29 may be employed not only in the aforementioned hard disk drive (HDD) 10 but also in any types of magnetic disk or tape drives. Additionally, the thin film magnetic head element 29 may be mounted not only on the aforementioned flying head slider 14 but also on a contact head slider comprising a medium-opposed surface which keeps contacting a recording medium such as a magnetic disk.

What is claimed is:

1. A thin film magnetic head comprising:

a magnetic core piece;

a coil including parallel conductive lines girdling around the magnetic core piece over a predetermined datum plane;

an insulating resin filler filled between the adjacent conductive lines; and an insulating metallic layer covering at least partly the insulating resin filler on the datum plane, said insulating metallic layer designed to define a flat top surface.

2. The thin film magnetic head according to claim 1, wherein the insulating metallic layer comprises a metallic oxide compound.

3. A thin film magnetic head comprising:

a tip pole piece exposed at a medium-opposed surface;

a coil girdling around over a predetermined datum plane and opposing its outer periphery to the tip pole piece;

an insulating resin filler filled between the tip pole piece and the coil; and an insulating metallic layer covering at least partly the insulating resin filler on the datum plane, said insulating metallic layer designed to define a flat top surface.

4. The thin film magnetic head according to claim 3, wherein the insulating metallic layer comprises a metallic oxide compound.

5. A thin film magnetic head comprising:

a magnetic core piece;

a coil girdling around the magnetic core piece over a predetermined datum plane;

an insulating resin filler filled between the magnetic piece and an inner outline of the coil; and an insulating metallic layer covering at least partly the insulating resin filler on the datum plane, said insulating metallic layer designed to define a flat top surface.

6. The thin film magnetic head according to claim 5, wherein the insulating metallic layer comprises a metallic oxide compound.

* * * * *